United States Patent [19]

Hern

[11] Patent Number: 5,363,930

[45] Date of Patent: Nov. 15, 1994

[54] DUAL-DIAPHRAGM LUBRICANT COMPENSATOR FOR EARTH-BORING BITS

[75] Inventor: Gregory L. Hern, Auburn, Wash.

[73] Assignee: Baker Hughes Incorporated, Houston, Tex.

[21] Appl. No.: 137,651

[22] Filed: Oct. 15, 1993

[51] Int. Cl.$^5$ ............................................. F21B 10/22
[52] U.S. Cl. ................................. 175/228; 175/371; 384/93
[58] Field of Search ............... 175/227, 228, 229, 371; 384/93, 94

[56] References Cited

U.S. PATENT DOCUMENTS

| | | | |
|---|---|---|---|
| 4,254,838 | 3/1981 | Barnetche | 175/228 |
| 4,386,667 | 6/1983 | Millsapps, Jr. | 175/228 |
| 4,388,984 | 6/1983 | Oelke | 175/228 X |
| 4,407,375 | 10/1983 | Nakamura | 175/228 |
| 4,552,228 | 11/1985 | Evans et al. | 175/228 |
| 4,577,705 | 3/1986 | Cross | 175/228 |
| 5,040,624 | 8/1991 | Schumacher et al. | 175/371 |
| 5,072,795 | 12/1991 | Delgado et al. | 175/371 X |
| 5,080,183 | 1/1992 | Schumacher et al. | 175/371 |

Primary Examiner—Ramon S. Britts
Assistant Examiner—Frank S. Tsay
Attorney, Agent, or Firm—Robert A. Felsman; Mark D. Perdue

[57] ABSTRACT

An earth-boring bit has a bit body and at least one saddle member secured to the bit body to receive and support each of a pair of ends of a journal member. A cutter is mounted for rotation on the journal member and a bearing is defined between the cutter and journal member. A lubricant reservoir is formed in the journal member to receive a quantity of lubricant and is in fluid communication with the bearing. A seal means is provided between the cutter and journal member to retain lubricant in the bearing. A hydrostatic-pressure compensator is disposed in the lubricant reservoir in communication with hydrostatic-pressure in the borehole in which the bit operates. The hydrostatic-pressure compensator responses to hydrostatic-pressure to equalize a pressure differential across the seal means. An internal-pressure compensator is disposed in the lubricant reservoir and is responsive to the internal pressure of the lubricant to prevent the lubricant from being extruded past the seal means.

19 Claims, 6 Drawing Sheets

DUAL-DIAPHRAGM LUBRICANT COMPENSATOR FOR EARTH-BORING BITS

BACKGROUND OF THE INVENTION

1. Field of the Invention

The present invention relates generally to lubricant compensator systems for earth-boring bits. More particularly, the present invention relates to lubricant compensator systems for earth-boring bits of the raise-boring and shaft-boring variety.

2. Background Information

Earth-penetrating tools are divided into two broad categories, those designed to form deep, relatively small diameter boreholes, and those designed to form shallow, large diameter boreholes. Earth-boring bits with rolling cutters mounted on cantilevered bearing shafts are often called "rock bits" and are employed in drilling relatively small diameter boreholes for the recovery of petroleum or other hydrocarbons, or to tap geothermal energy sources. The nature of such drilling operations is that the operations are continued until bit life is nearly or completely expended. These rock bits when used in mining operations, such as the drilling of blast holes, generally are not recovered from the borehole until the bit is effectively destroyed. To extend the life of such rock bits, many are provided with lubrication systems that include a pressure compensator to limit the pressure differential existing between the lubricant and the pressure in the borehole resulting from the presence of drilling fluid in the borehole.

In addition to pressure exerted on the bit by drilling fluids, temperatures increase in the lubricant as the bit is exposed to geothermal temperatures and to frictional heat build-up caused during rotation of the bit. These temperature increases cause an increase in the internal pressure of the lubricant, which causes the lubricant to expand. The increase in the internal pressure of the lubricant may also cause the lubricant to "crack" or emit gaseous hydrocarbons. If an earth-boring bit is of the type having positive seals between the cutters and bearing shafts on which the cutters rotate, the internal pressure build-up can be great enough to damage either the pressure compensator diaphragm or the seal between one of the cutters and bearing shaft. A conventional practice to avoid seal or diaphragm damage is to provide a pressure-relief valve in the lubricant reservoir. Such a pressure-relief valve permits release of lubricant upon the internal pressure of the lubricant exceeding a pre-determined maximum. One example of a pressure relief valve is disclosed in U.S. Pat. No. 3,942,596, Mar. 9, 1976, to Millsapps.

Another type of earth-boring bit employs a plurality of rolling cutters, usually in excess of three, arranged to drill relatively large diameter holes for mining applications. These types of earth-boring bits are used for raise-boring or shaft-boring, which result in large diameter boreholes or shafts.

In raise-boring operations, a pilot hole is drilled with a drillstring, a bit is secured to the drillstring and is rotated and pulled upwardly from a pilot hole to bore a vertical or near vertical shaft. Cuttings generated by the boring operations fall down the shaft and are collected at the bottom of the raise shaft. Because drilling operations are conducted upwardly, it is not feasible to provide cooling and lubricating drilling fluid in raise-boring operations. Thus, the bit experiences considerable frictional heat build-up and the resulting increase in the internal pressure of the lubricant. Therefore, in raise-boring operations, the ability to effectively compensate for internal pressure build-up in the lubricant becomes very important to avoid damage to cutter seals.

In shaft boring operations, the bit is secured directly to a drilling machine and is rotated and pushed through the formation to bore shafts. Drilling fluid is commonly used and exerts hydrostatic pressure on the bit, wherein hydrostatic-pressure compensation becomes quite important, and internal-pressure compensation is less important. Thus, shaft boring bits are provided with lubricant compensators similar to those employed in the small diameter rock bits, with only a pressure-relief valve to attempt to prevent damage to cutter seals from internal pressure increases in the lubricant.

Prior-art lubrication systems do not address the need for both hydrostatic-pressure and internal-pressure compensation of lubricant in the cutters of earth-boring bits of the raise- and shaft-boring variety. A need exists, therefore, for a lubricant compensation system that is capable of compensating lubricant in a lubricant reservoir to equalize pressure differentials existing in the lubricant due to both hydrostatic pressure in the borehole and internal pressure of the lubricant resulting from temperature changes in the lubricant.

SUMMARY OF THE INVENTION

It is a general object of the present invention to provide an improved lubricant pressure compensation system for an earth-boring bit of the raise-boring or shaft-boring variety.

This and other objects of the present invention are accomplished by providing an earth-boring bit with a bit body and at least one saddle member to receive and support each of a pair of ends of a journal member. A cutter is mounted for rotation on the journal member and a bearing is defined between the cutter and journal member. A lubricant reservoir is formed in the journal member to receive a quantity of lubricant and is in fluid communication with the bearing. A seal means is provided between the cutter and journal member to retain lubricant in the bearing. A hydrostatic-pressure compensator is disposed in the lubricant reservoir in communication with hydrostatic-pressure in the borehole in which the bit operates. The hydrostatic-pressure compensator is responsive to hydrostatic-pressure to equalize pressure differential across the seal means. An internal-pressure compensator is disposed in the lubricant reservoir and is responsive to the internal pressure of the lubricant to prevent the lubricant from being extruded past the seal means.

According to the preferred embodiment of the present invention, the lubricant reservoir is a longitudinal bore extending at least partially through the journal member to define at least one open end. The hydrostatic-pressure and internal-pressure compensators each are resilient finger diaphragms disposed in the longitudinal bore. The hydrostatic-pressure compensator finger diaphragm is disposed proximally to the open end of the bore, and the internal-pressure compensator diaphragm is disposed at a generally opposite end of the bore.

In an alternative embodiment of the present invention, only one of the hydrostatic-pressure and internal-pressure compensators is disposed in the longitudinal bore and the other is replaced with a solid plug, wherein the lubricant compensator is easily converted from a hydrostatic-pressure compensator to an internal-pressure compensator, and vice-versa.

Other objects, features, and advantages of the present invention will become apparent with reference to the Figures and detailed description, which follow.

DESCRIPTION OF THE PREFERRED EMBODIMENT

Figure 1:
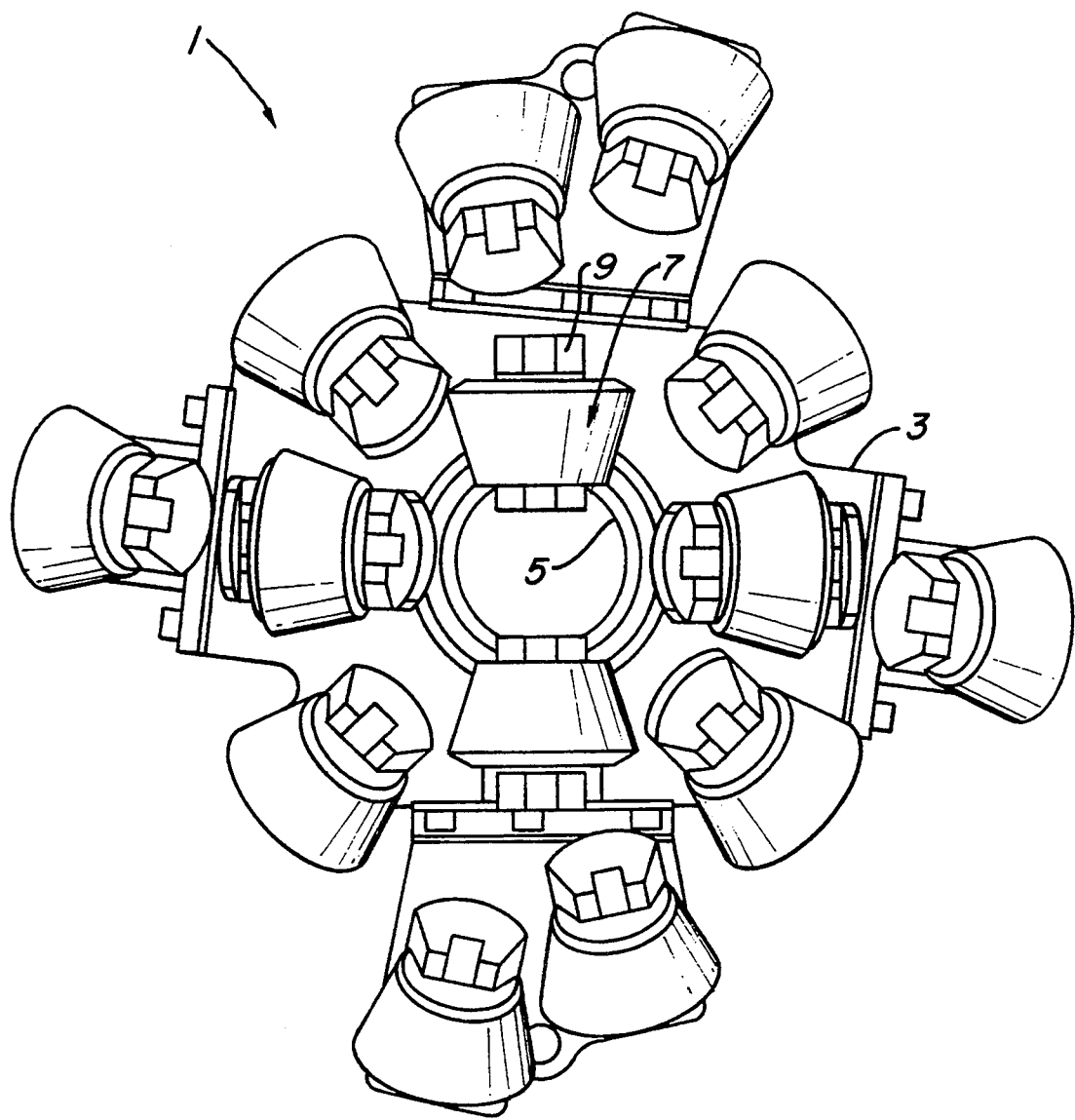
FIG. 1 is a plan view of an earth-boring bit of the raise-boring variety constructed according to the present invention.

With reference now to FIG. 1, an earth-boring bit 1 of the type contemplated by the present invention is illustrated. Bit 1 includes a bit body 3, which has a bore 5 through a central portion thereof. Bit 1 is illustrated as a raise-boring bit that is provided with a bore 5 that receives a stem (not shown), which is in turn coupled to a drillstring for rotation of bit 1. A plurality of cutter assemblies are secured to bit body 3, each cutter assembly having a rolling cutter 7 secured to bit body 3 by a saddle 9. The cutter assemblies are virtually identical whether employed in a raise-boring bit, as shown, or a shaft-boring bit.

Figure 2:
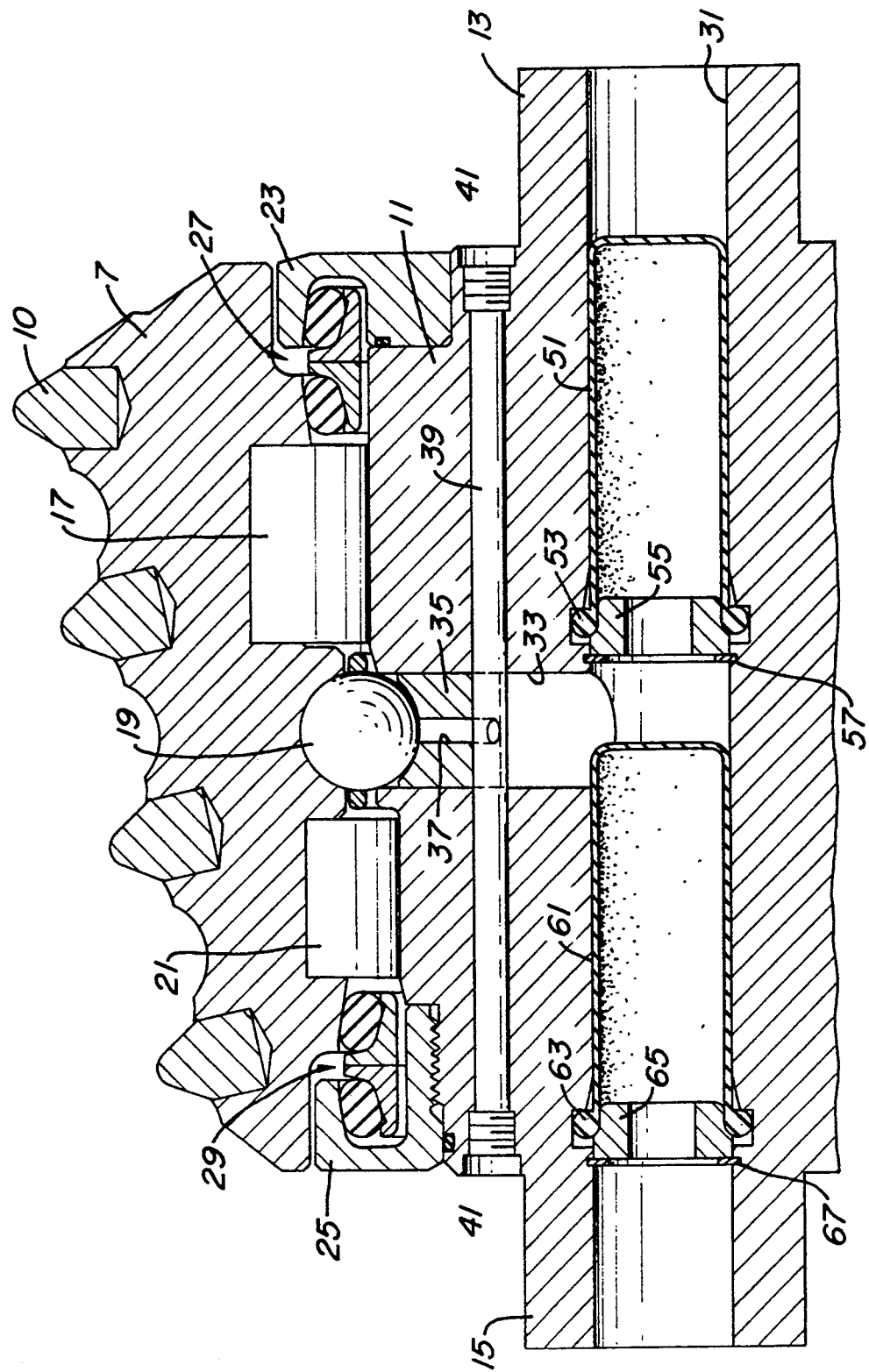
FIG. 2 is an enlarged, fragmentary longitudinal section view of the journal and cutter of the earth-boring bit of FIG. 1.

FIG. 2 is an enlarged, fragmentary, longitudinal section view of a cutter assembly of an earth-boring bit 1 according to the present invention. Cutter 7, which has a plurality of hard-metal inserts 10, preferably formed of cemented tungsten carbide, secured to the outer surface thereof by interference fit, is mounted for rotation on a journal member 11. Journal member 11 has a pair of ends 13, 15 each of which is secured to saddle 9. A bearing is defined between cutter 7 and journal member 11. According to a preferred embodiment of the present invention, the bearing is an anti-friction bearing including a first roller bearing element 17, a ball element 19, and a second roller bearing element 21. A pair of seal retainers 23, 25 retain and locate a pair of seal means 27, 29 at each end of the bearing. Seal means 27, 29 serve to retain lubricant within the bearing, and to prevent foreign material from the borehole from entering the bearing. Preferably, each seal means 27, 29 comprises a rigid metal face seal.

A longitudinal bore 31 is formed through journal member 11 to define at least one open end. Preferably, longitudinal bore 31 extends entirely through journal member 11 to define two open ends. A lubricant passage 33 extends generally transversely from longitudinal bore 31 and is in fluid communication with bearing members 17, 19, 21. According to a preferred embodiment of the present invention, ball bearing element 19 serves to rotatably retain cutter 7 on journal member 11. Ball bearing members 19 are fed into the bearing cavity through longitudinal bore 31 and lubricant passage 33. A ball plug 35, including a passage 37 for fluid communication between the bearing and lubricant passage 33, retains ball bearing members 19 within the bearing race. Ball plug 35 is retained in lubricant passage 33 by a transverse retainer rod 39, which extends longitudinally through journal member 11 and is retained therein by threaded plugs 41.

An hydrostatic-pressure compensator 51 is disposed in an open end of longitudinal bore in fluid communication with hydrostatic pressure in the borehole in which bit 1 operates. Hydrostatic-pressure compensator 51 is a resilient elastomeric finger diaphragm having a radially enlarged base 53. Base 53 is received in a radial recess in longitudinal bore 31 and is retained therein by a plug 55 and a snap ring 57. An internal-pressure compensator 61 is disposed in longitudinal bore 31 at an end of bore 31 generally opposite from that in which hydrostatic-pressure compensator 51 is disposed. Preferably, internal-pressure compensator 61 is a resilient, elastomeric finger diaphragm having a radially enlarged base 63. Base 63 is received in a radial recess in longitudinal bore 31 and is retained therein by plug 65 and snap ring 67.

Thus, longitudinal bore 31, hydrostatic-pressure compensator 51, internal-pressure compensator 61 and lubricant passage 33 combine to form a lubricant reservoir in fluid communication with bearing members 17, 19, 21 via lubricant passage 37 in ball plug 35. The lubricant reservoir is vacuum-filled with a quantity of lubricant in a conventional manner. Seal means 27, 29 retain lubricant within the bearing, and prevent foreign material from the borehole from entering the bearing.

Figure 3:
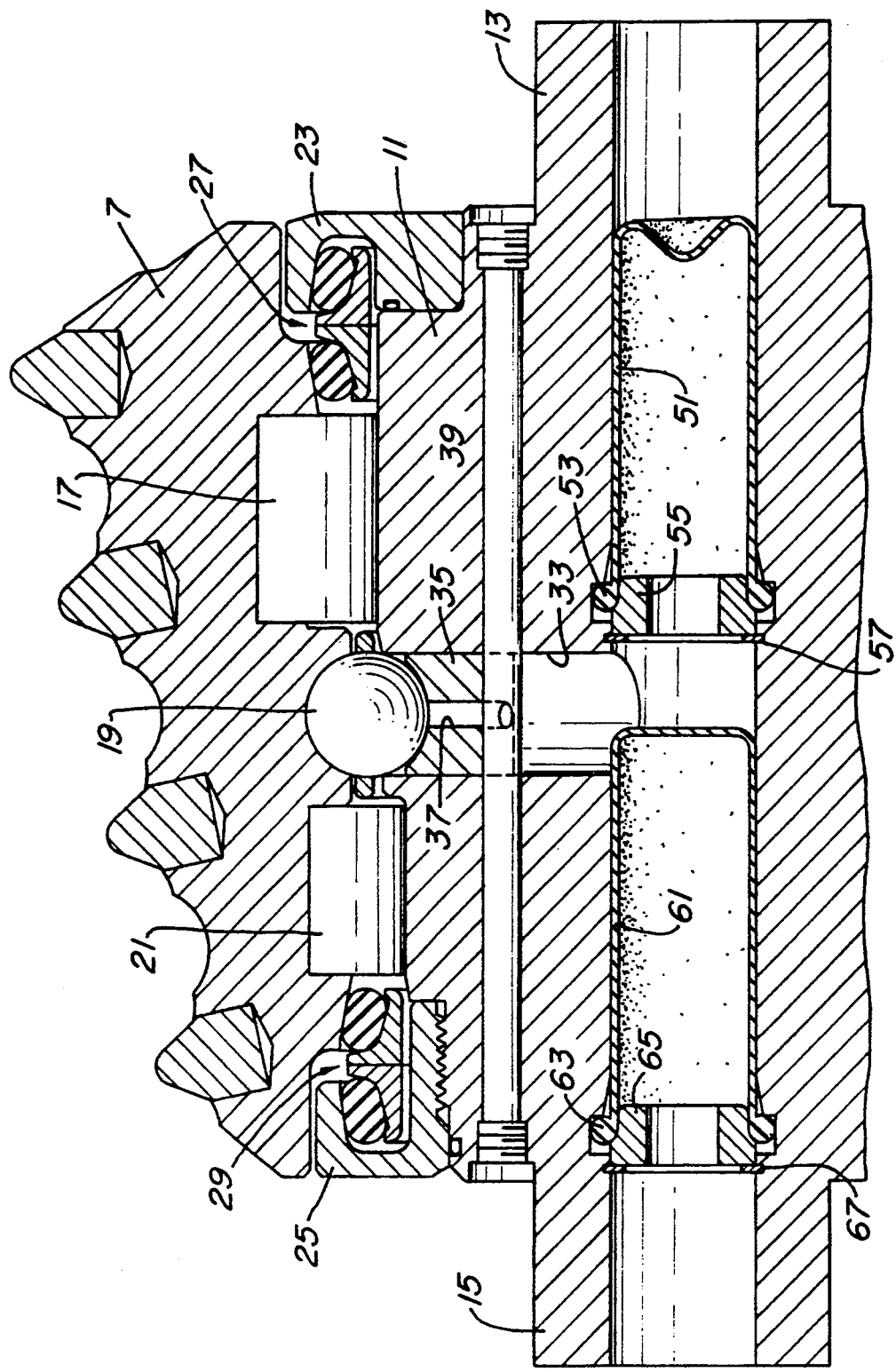
FIG. 3 is an enlarged, fragmentary longitudinal section view of the cutter and journal member of FIG. 2, illustrating the deformation of the hydrostatic-pressure compensator.

FIG. 3 is an enlarged, fragmentary, longitudinal section view of the cutter assembly of FIG. 2 illustrating hydrostatic-pressure compensator 51 in a deformed condition. As bit 1 operates in a borehole filled with drilling fluid, eventually the borehole or shaft will reach sufficient depth that the hydrostatic pressure exerted by the drilling fluid on bit 1, seals 27, 29, and hydrostatic-pressure compensator 51 will exceed the pressure in the lubricant reservoir and bearing. If this pressure differential is not equalized, seals 27, 29 may leak or be damaged, permitting foreign material to enter the bearing, and cause the bearing to fail. Responsive to the hydrostatic-pressure differential, finger diaphragm 51 collapses or deforms to equalize the pressure differential across seals 27, 29, wherein seals 27, 29 maintain their integrity.

Figure 4:
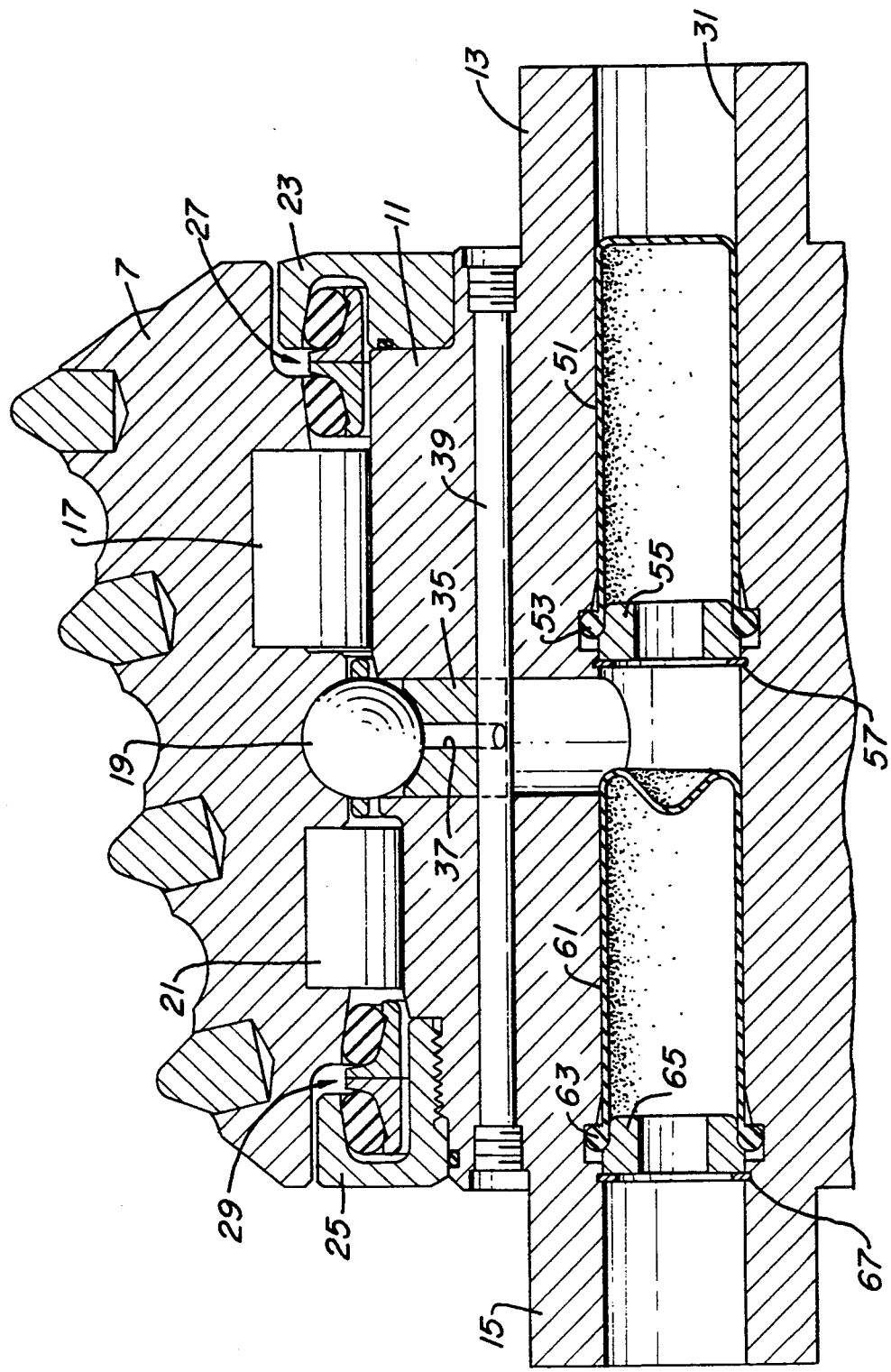
FIG. 4 is an enlarged, fragmentary longitudinal section view of the cutter and journal member of FIG. 2, illustrating the deformation of the internal-pressure compensator.

FIG. 4 is an enlarged, fragmentary, longitudinal section view of the cutter assembly of FIGS. 2 and 3 depicting the deformation or collapse of internal-pressure compensator 61. During drilling operation in a borehole, earth-boring bit 1 may be exposed to increased temperatures. Increased temperatures may result from geothermal temperature gradients or frictional heat generated during drilling operation. As the ambient temperature in which bit 1 operates increases, the temperature and internal pressure of the lubricant in lubricant reservoir also increases. As the internal pressure of the lubricant increases, the volume occupied by the lubricant also increases. The pressure differential across seals 27, 29 resulting from the internal pressure of the lubricant can extrude or force lubricant past seals 27, 29 or even damage seals 27, 29, in either case resulting in premature lubricant loss and bearing failure. As the internal pressure of the lubricant exceeds that of the ambient or borehole pressure, finger diaphragm 61 collapses or deforms to accommodate the volumetric expansion of the lubricant, thus equalizing the pressure differential across seals 27, 29. Extrusion of lubricant across seals 27, 29 and damage to seals 27, 29 is thus avoided.

Figure 5:
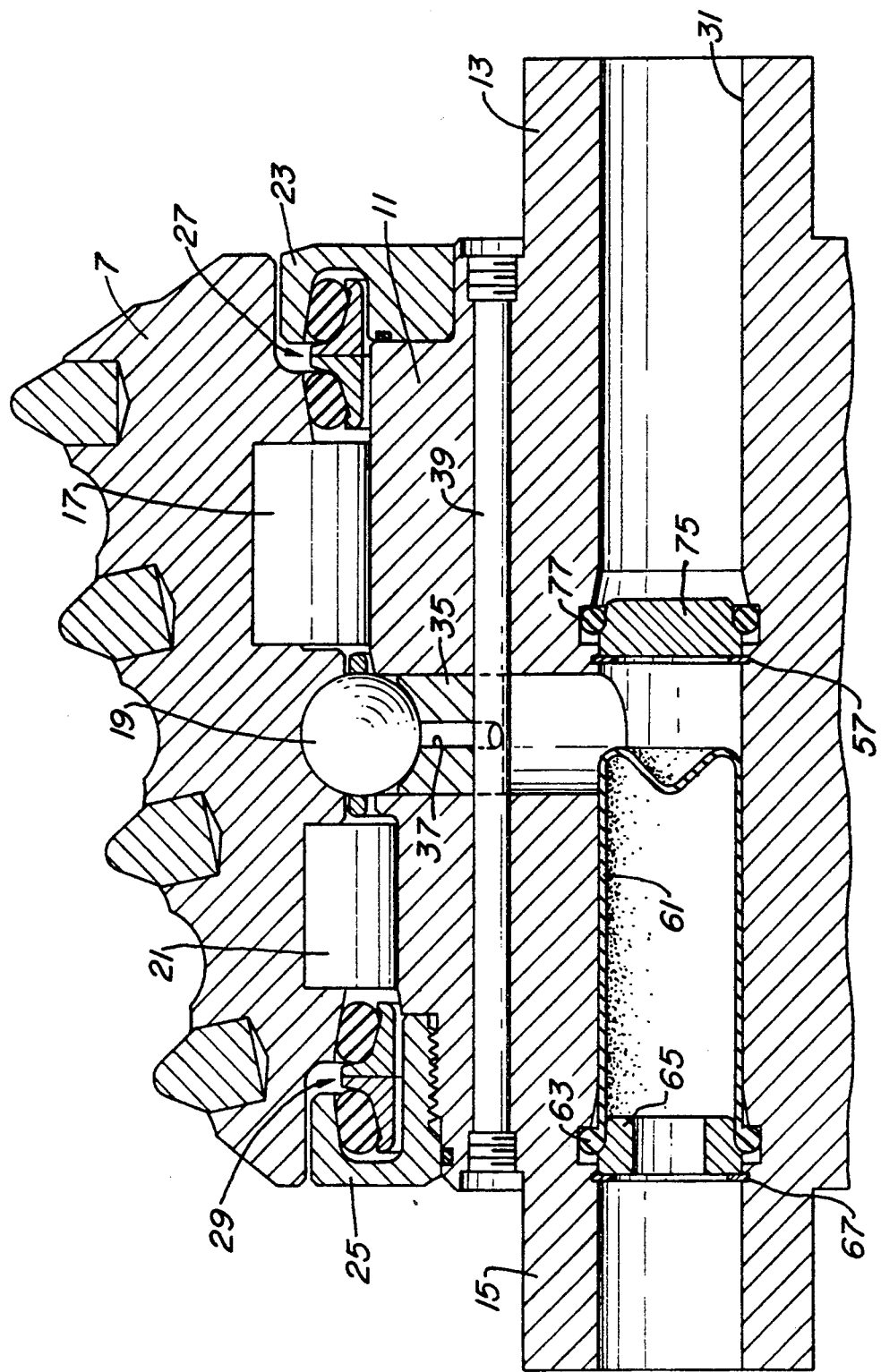
FIGS. 5 and 6 are enlarged, fragmentary longitudinal section views of alternative embodiments of the present invention.
Figure 6:
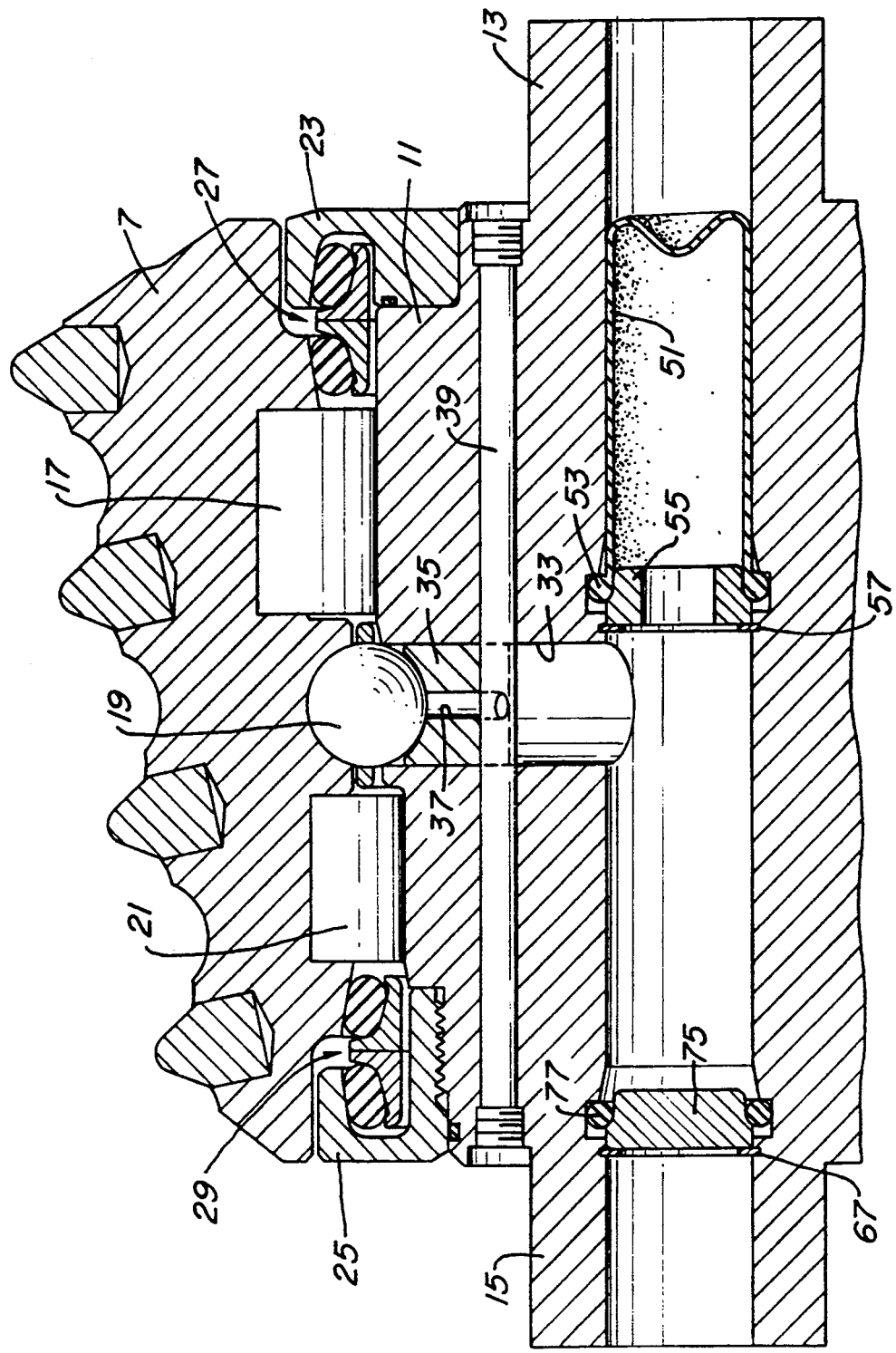

FIGS. 5 and 6 are enlarged, fragmentary longitudinal section views of cutter assemblies according to an alternative embodiment of the invention. FIG. 5 illustrates a cutter assembly for a raise-boring bit in which the hydrostatic-pressure compensator is eliminated in favor of a solid plug 75 and o-ring 77. Plug 75 and internal-pressure compensator 61 cooperate with longitudinal bore 31 to define the lubricant chamber. Because hydrostatic pressure is not generally encountered in raise-boring, the embodiment depicted in FIG. 5 is particularly adapted for raise boring, and internal-pressure compensator 61 functions similarly to that described with reference to FIG. 3.

FIG. 6 illustrates a cutter assembly for a shaft-boring bit in which the internal-pressure compensator is eliminated in favor of solid plug 75 and o-ring 77. Plug 75 and hydrostatic-pressure compensator 51 cooperate with longitudinal bore 31 to define the lubricant chamber. Because cooling and lubricating drilling fluid is present during shaft boring, and internal-pressure compensation is less important, the embodiment depicted in FIG. 6 is particularly adapted for shaft boring, and hydrostatic-pressure compensator 51 functions similarly to that described with reference to FIG. 4. Thus, simply by transposing the location of plug 75 and diaphragm 51, 61, the cutter assembly may be readily converted from one adapted for shaft boring to one adapted for raise boring and vice-versa with relative ease.

With reference to FIGS. 1-6, the operation of raise-boring earth-boring bit 1 according to the present invention will be described. Earth-boring bit 1 first is secured to a drilling machine. A stem is secured in bore 5 by interference fit and the stem, in turn, is secured to a drillstring. Bit 1 then is rotated and pulled through formation material. Cutters 7 roll and slide over formation material, crushing and disintegrating the formation material to form a borehole or shaft. The cuttings generated by the crushing action of cutters fall away from bit 1.

As the pressure differential across seals 27, 29 increases due to increases in the internal pressure of the lubricant resulting from increased borehole or bit temperatures, internal-pressure compensator 61 deforms to equalize the pressure differential. Upon completion of drilling operations, the lubricant reservoir of each cutter 7 may be refilled with lubricant and drilling operations may be recommenced.

In shaft-boring operations, drilling fluid is used and hydrostatic pressure is exerted on the bit and cutter assembly. As the pressure differential across seals 27, 29 increases due to hydrostatic pressure in the borehole, hydrostatic-pressure compensator 51 deforms or collapses in response to the hydrostatic pressure to equalize the pressure differential.

The earth-boring bit according to the present invention has a number of advantages. A principal advantage of the present invention is the provision of an earth-boring bit of the shaft- or raise-boring variety with a lubricant pressure compensator system that equalizes pressure differentials resulting from hydrostatic pressure increases as well as internal pressure increases. This results in a longer-lasting and more economical earth-boring bit that may be used in either shaft or raise boring operations.

The present invention has been described with reference to a preferred embodiment thereof. The invention is thus not limited but is susceptible to variation and modification without departing from the scope and spirit thereof.

I claim:

1. An improved earth-boring bit comprising:
   a bit body;
   at least one journal member having a pair of ends;
   at least one saddle member secured to the bit body to receive and support each end of the journal member;
   a cutter mounted for rotation on the journal member, the cutter and journal member defining a bearing therebetween;
   a lubricant reservoir formed in the journal member to receive a quantity of lubricant, the lubricant reservoir being in fluid communication with the bearing;
   seal means between the cutter and journal member to retain the lubricant in the bearing;
   a hydrostatic-pressure compensator disposed in the lubricant reservoir and in communication with hydrostatic pressure in a borehole in which the earth-boring bit operates, the hydrostatic-pressure compensator being responsive to the hydrostatic pressure to equalize a pressure differential across the seal means; and
   an internal-pressure compensator disposed in the lubricant reservoir, the internal-pressure compensator being responsive to internal pressure of the lubricant to prevent the lubricant from being extruded past the seal means.

2. The earth-boring bit according to claim 1 wherein the bearing further includes at least one anti-friction member disposed and releasably retained between the cutter and the journal member.

3. The earth-boring bit according to claim 1 wherein the lubricant reservoir is a bore longitudinally extending at least partially through the journal member to define at least one open end, and the hydrostatic-pressure compensator and internal-pressure compensator each are finger diaphragms disposed in the bore, the hydrostatic-pressure compensator finger diaphragm being disposed proximal to the open end of the bore and the internal-pressure compensator finger diaphragm being disposed at a generally opposite end of the bore.

4. The earth-boring bit according to claim 1 wherein the seal means comprises at least one rigid face seal.

5. An improved earth-boring bit comprising:
   a bit body;
   at least one journal member having a pair of ends;
   at least one saddle member secured to the bit body to receive and support each end of the journal member;
   a cutter mounted for rotation on the journal member;
   at least one antifriction bearing generally disposed between the cutter and the journal member;
   a lubricant reservoir to receive a quantity of lubricant and in fluid communication with the bearing, the lubricant reservoir including a bore formed through the journal member and having at least one open end in fluid communication with an exterior of the journal member;
   seal means between the cutter and journal member to retain the lubricant in the bearing;
   a lubricant compensator assembly disposed in the bore and including:

a hydrostatic-pressure diaphragm disposed in the bore and in communication with hydrostatic pressure in a borehole in which the earth-boring bit operates through the open end of the bore, the hydrostatic-pressure diaphragm being responsive to the hydrostatic pressure to equalize a pressure differential across the seal means; and an internal-pressure diaphragm disposed in the bore, the internal-pressure diaphragm member being responsive to the internal pressure of the lubricant to prevent the lubricant from being extruded past the seal means.

6. The earth-boring bit according to claim 5 wherein hydrostatic-pressure and internal-pressure diaphragms are elongated, resilient, generally cylindrical finger diaphragms having a radially enlarged seal member at one end thereof for engagement with an annular recess in the bore.

7. The earth-boring bit according to claim 5 wherein the seal means comprises a rigid face seal.

8. The earth-boring bit according to claim 5 further including a passage extending from the bore to the bearing.

9. The earth-boring bit according to claim 5 wherein the antifriction bearing includes at least one spherical element to secure the cutter on the journal member.

10. An improved earth-boring bit comprising:
a bit body;
at least one journal member having a pair of ends;
at least one saddle member secured to the bit body to receive and support each end of the journal member;
a cutter mounted for rotation on the journal member;
at least one antifriction bearing generally disposed between the cutter and the journal member, the antifriction bearing including at least one spherical element to secure the cutter on the journal member;
a lubricant reservoir to receive a quantity of lubricant, the lubricant reservoir including a bore formed through the journal member and having at least one open end in fluid communication with an exterior of the journal member;
a lubricant passage in fluid communication with the bearing and the lubricant reservoir;
a retainer plug releasably secured in the lubricant passage to permit selective retention of the spherical element in the anti-friction bearing;
seal means between the cutter and journal member to retain the lubricant in the bearing;
a lubricant compensator assembly disposed in the bore and including:
a hydrostatic-pressure diaphragm disposed in the bore and in communication with hydrostatic pressure in a borehole in which the earth-boring bit operates through the open end of the bore, the hydrostatic-pressure diaphragm being responsive to the hydrostatic pressure to equalize a pressure differential across the seal means; and
an internal-pressure diaphragm disposed in the bore, the internal-pressure diaphragm member being responsive to the internal pressure of the lubricant to prevent the lubricant from being extruded past the seal means.

11. The earth-boring bit according to claim 10 wherein the bore extends generally longitudinally through the journal member and the lubricant passage extends generally transversely from the bore to the bearing.

12. The earth-boring bit according to claim 10 wherein the spherical element is assembled into the bearing through the bore and lubricant passage.

13. The earth-boring bit according to claim 10 wherein the retainer plug is secured in the lubricant passage by a retainer rod extending through the journal member, the retainer rod being removably secured in the journal member.

14. The earth-boring bit according to claim 10 wherein the hydrostatic-pressure and internal-pressure diaphragms are elongated, resilient, generally cylindrical finger diaphragms having a radially enlarged seal member at one end thereof for engagement with an annular recess in the bore.

15. An improved earth-boring bit comprising:
a bit body;
at least one journal member having a pair of ends;
at least one saddle member secured to the bit body to receive and support each end of the journal member;
a cutter mounted for rotation on the journal member;
at least one antifriction bearing generally disposed between the cutter and the journal member, the antifriction bearing including at least one spherical element to secure the cutter on the journal member;
a lubricant reservoir to receive a quantity of lubricant, the lubricant reservoir including a bore formed through the journal member and having at least one open end in fluid communication with an exterior of the journal member;
a lubricant passage in fluid communication with the bearing and the lubricant reservoir;
a retainer plug releasably secured in the lubricant passage to permit selective retention of the spherical element in the anti-friction bearing;
seal means between the cutter and journal member to retain the lubricant in the bearing;
a lubricant compensator removably disposed in the bore and including one of:
a hydrostatic-pressure diaphragm in communication with hydrostatic pressure in a borehole in which the earth-boring bit operates through the open end of the bore, the hydrostatic-pressure diaphragm being responsive to the hydrostatic pressure to equalize a pressure differential across the seal means; and
an internal-pressure diaphragm responsive to the internal pressure of the lubricant to prevent the lubricant from being extruded past the seal means; and
a solid plug removably disposed in the longitudinal bore and cooperating with the lubricant compensator to define the lubricant chamber.

16. The earth-boring bit according to claim 15 wherein the bore extends generally longitudinally through the journal member and the lubricant passage extends generally transversely from the bore to the bearing.

17. The earth-boring bit according to claim 15 wherein the spherical element is assembled into the bearing through the bore and lubricant passage.

18. The earth-boring bit according to claim 15 wherein the retainer plug is secured in the lubricant passage by a retainer rod extending through the journal member, the retainer rod being removably secured in the journal member.

19. The earth-boring bit according to claim 15 wherein the hydrostatic-pressure and internal-pressure diaphragms are elongated, resilient, generally cylindrical finger diaphragms having a radially enlarged seal member at one end thereof for engagement with an annular recess in the bore.

* * * * *